United States Patent [19]
Kotuby et al.

[11] 3,813,013
[45] May 28, 1974

[54] AEROSOL METERING VALVE

[75] Inventors: Paul M. Kotuby, Naugatuck; Alvydas Velicka, New Haven, both of Conn.

[73] Assignee: The Risdon Manufacturing Company, Naugatuck, Conn.

[22] Filed: June 27, 1972

[21] Appl. No.: 266,656

[52] U.S. Cl............................ 222/402.2, 222/402.24
[51] Int. Cl............................................. B65d 83/00
[58] Field of Search................... 222/402.20, 402.24

[56] References Cited
UNITED STATES PATENTS

| 2,667,991 | 2/1954 | Boyer | 222/402.20 X |
| 2,828,892 | 4/1958 | Ward | 222/402.20 X |
| 3,185,356 | 5/1965 | Venus, Jr. | 222/402.20 |
| 3,313,459 | 4/1967 | Mizuguchi | 222/402.20 |
| 3,511,418 | 5/1970 | Venus, Jr. | 222/402.20 |

Primary Examiner—Robert B. Reeves
Assistant Examiner—David A. Scherbel
Attorney, Agent, or Firm—Steward & Steward

[57] ABSTRACT

An aerosol metering valve is disclosed which features improvements in design to provide lower operating force requirements, facilitate manufacturing changes in metering capacity, and to insure greater consistency in the metered amounts of fluid dispensed. The valve incorporates an apertured elastic boot in combination with a replaceable metering chamber sleeve, which together fit into a standard type of valve body. A valve stem reciprocates within the metering chamber sleeve, and when depressed obturates the aperture in the boot, preventing further admission of fluid to the metering chamber. Continued travel of the stem beyond such point, permitted by elastic extension of the boot, positions a discharge port of the stem within the metering chamber to allow the measured fluid contents thereof to be discharged through the stem to atmosphere. Provision is made in the design of the boot to facilitate its elongation by the stem, and also to minimize the effect of swelling of the elastomer material of the boot on extended exposure of it to the fluid product.

7 Claims, 3 Drawing Figures

PATENTED MAY 28 1974  3,813,013

AEROSOL METERING VALVE

BACKGROUND OF THE INVENTION

1. Field of the Invention

This invention pertains to metering valves for use in connection with self-pressurized packages of fluid products, commonly denoted aerosol dispensers. As is typical of valves of this type, the valve herein disclosed is designed to dispense a uniform metered volume of fluid product from a pressurized container each time the valve is operated.

The valve herein disclosed is an improvement over valves of the type disclosed in U.S. Pat. No. 3,185,356, granted May 25, 1965.

2. Description of the Prior Art

Metering valves are used extensively in many of the familiar aerosol packages in which a great variety of fluid products are commercially sold today. These metering valves help the consumer to dispense the proper amount of a product and to avoid waste. Controlled dispensing is especially important for drug and pharmaceutical products since these are not only expensive but must generally be administered in accurately measured doses for reasons of effective medication or safety.

There are a number of conflicting objectives which constantly confront the designers and manufacturers of these valves, and principal among these is the provision of valves which are thoroughly reliable and uniform in operation, yet are of such minimal cost as to make the "throw-away" container method of packaging economically practical.

The basic operating principle of conventional aerosol metering valves involves the provision of a valve assembly having a fluid metering or measuring chamber, usually formed by a portion of the valve body or housing. Such chamber is provided with an inlet which normally is in open communication with the interior of the container in which the valve assembly is mounted, so that fluid aerosol product from a main body of same in the container may enter into the metering chamber of the valve under the pressure of a low-boiling gas propellant admixed with the product. Such metering chamber also has an outlet from which the product is eventually released to atmosphere, but which in the normal, non-dispensing condition of the valve assembly is closed by an operating member and associated seal. Practically all aerosol metering valves in commercial use today incorporate a reciprocable core or stem having a discharge port and a fluid outlet passage and dispensing nozzle associated therewith. The stem is mounted for reciprocation in the measuring chamber, and the aforesaid seal peripherally but slidingly grips the stem at the outlet of the metering chamber to prevent escape of the product from the chamber. However, upon depressing the stem, the latter slides relative to the outlet seal until its port is moved past the seal and into the metering chamber, thus by-passing the seal and allowing the contents of the metering chamber to flow out under its own pressure into the fluid passage of the stem. In the course of moving or sliding the stem to the dispensing position just described, the inlet to the metering chamber is closed, which closing is arranged to occur before the by-passing of the outlet seal by the stem port. Otherwise, of course, product within the main body of the container would continue to enter the metering chamber and prevent any accurate automatic control of the amount dispensed on each actuation of the stem.

In order to achieve the time sequence of metering chamber inlet-closing, outlet-opening operation just described, it is necessary that a certain amount of travel of the stem be permitted to occur after the inlet has been closed. This is commonly referred to as overtravel and various schemes have been proposed to accomplish this, one of which is disclosed in the aforesaid U.S. Pat. No. 3,185,356. The design of the valve disclosed in that patent has proven quite satisfactory for use in most respects. However improvement in that earlier design has been desirable in respect to further minimizing the valve actuating forces required, as well as to facilitate manufacturing changes in valve metering capacity and to insure greater consistency in the metered amounts of fluid dispensed upon each actuating cycle. Further reduction of operating force requirements is of particular advantage in the provision of automatically cycled dispensing containers of the type which are motorized or otherwise actuated at periodic intervals to dispense deodorants, disinfectants, insecticides and the like.

SUMMARY OF THE INVENTION

The metering valve construction herein disclosed provides improvement in the aforesaid areas. In general, the novel valve again make use of a distendable elastic thimble or boot member, as in the earlier design referred to, which is employed to control the entrance of fluid product to the metering chamber. In this instance, however, the metering chamber is defined by a separable tubular sleeve which is telescopingly received in the usual valve body and which is provided with a reduced or necked inlet end about which the boot is stretched to fit snugly along the side and end walls of such necked portion of the sleeve. The boot is centrally apertured to register with the inlet of the valve body and metering sleeve, and a reciprocable valve stem is telescopingly received in and guided by the metering sleeve. In the normal non-dispensing position of the valve stem, its inner end is spaced axially slightly outwardly of the aperture in the boot so that free communication is provided between the metering chamber and the interior of the container in which the valve is mounted. The valve stem is, as usual, provided with a lateral discharge port and a communicating fluid passage at its outer end. In the non-dispensing position, the port is positioned exteriorly of an annular sealing grommet which makes a sliding fit about the valve stem and closes off the outlet end of the metering sleeve and valve housing. The valve stem is provided intermediate its extent with an annular enlargement which engages the underside of the aforesaid seal to limit axial outward motion of the stem, as well as to help form an effective fluid tight seal at such point. Upon depressing the valve stem, its inner end is first brought into closing relation to the aperture of the elastic boot, prior to movement of the valve stem discharge port beneath the annular seal. Communication between the dispensing container and the metering chamber of the valve is thus interrupted. Further inward travel of the valve stem, as permitted by distention of the boot, causes the valve stem discharge port to pass beneath the annular seal and into communication with the metering chamber, allowing the contents of that chamber to exhaust through the port and fluid passage of the stem.

Metering sleeves of different internal capacities may be assembled in a valve body of standard size and configuration during manufacture of the valve assembly, thereby changing the amount of product dispensed on each actuating cycle of the valve. The arrangement herein described is particularly suitable for accurately metering small amounts of fluid product which has presented problems with existing valve designs. Additional advantages of the novel valve are provided by a boot design and cooperating inlet end configuration of the metering chamber on which the boot is supported to minimize the effect upon accurate metering capability arising from swelling or stretching of the elastomeric material of which the boot is formed, due to prolonged exposure of such member to contact with various liquid materials within the aerosol container.

Further advantages of the novel valve will become apparent from the description of a preferred embodiment illustrated in the accompanying drawings, wherein FIG. 1 is a cross sectional view in side elevation of a valve assembly including the usual dip tube and valve mounting cup for securing the valve assembly in the mouth of a container, the valve being shown in non-dispensing position;

FIG. 2 is essentially identical to FIG. 1 but with the valve shown in actuated or dispensing position, and FIG. 3 is a sectional view of the elastic boot, on an enlarged scale.

DESCRIPTION OF THE PREFERRED EMBODIMENT

Figure 1:
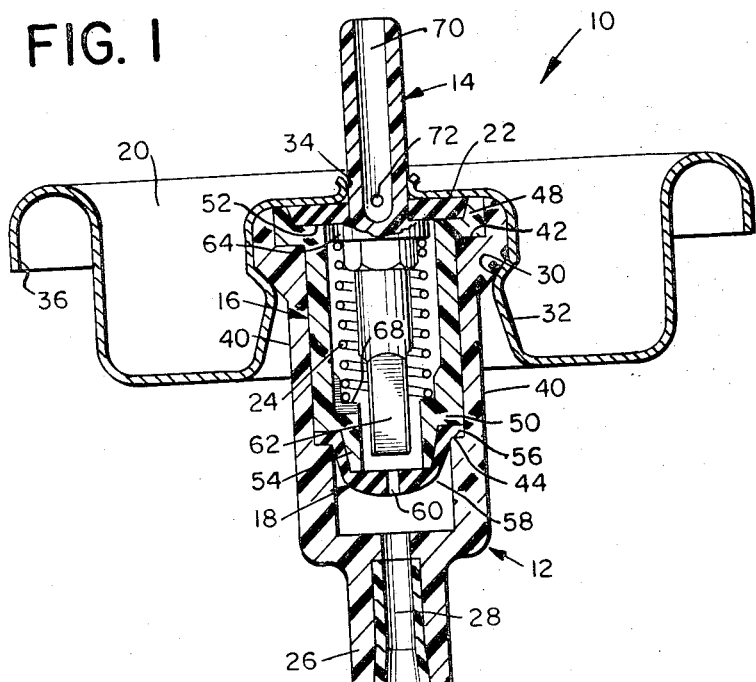

Referring to the drawings, a valve assembly 10 is comprised of a valve cup or outer housing 12, a core or stem 14, a substantially rigid metering chamber sleeve 16, a resilient thimble or boot member 18, a mounting ferrule 20 and a stem sealing grommet 22, together with a coil spring 24, as the components of the assembly.

Valve housing 12 is of molded plastic and is provided with a hollow tail member 26 forming an inlet passage 28 at the inner end of the housing. A dip tube 30 is secured in inlet passage 28 to provide communication between the interior of the container (not shown) within which the valve assembly is mounted and the interior of valve housing 12.

Valve housing 12 is formed adjacent its upper or outer end with an external shoulder 30 which is gripped in the central post 32 of a sheet metal mounting ferrule 20 in conventional manner. The top wall of post 32 is apertured at 34 to allow an outer portion of the stem 14 to project outwardly from the housing. The outer periphery of ferrule 20 is curled to form a skirt or lip 36 which can be crimped to the chine at the mouth of the container to which the valve assembly is mounted. A flowed-in gasket is provided under lip 36 to assist in making a fluid tight seal with the container.

Valve housing 12 is open at its upper or outlet end, and its wall 40 is stepped at such outlet to form an annular seat 42. Valve housing 12 is further stepped in wall 40 to provide a second annular seat 44 disposed inwardly of the first seat.

Metering sleeve 16 is designed to make a close, telescoped fit within the outlet end of housing 12, and a first external annular shoulder 48 abuts upon the annular seat 42 of the housing, positioning a second external annular shoulder 50 of the metering sleeve closely adjacent the second annular seat 44 of the housing. Shoulder 50 and seat 44 cooperate to form a clamping arrangement for boot 18 as more fully described below, while shoulder 48 and seat 42 cooperate to properly position and support the metering sleeve in the housing.

At its outlet end, metering sleeve 16 is formed to provide an annular recess 52, and sealing grommet 22 is disposed in this recess, being gripped around its external periphery between sleeve 16 and the end wall of post 32 to form a fluid tight seal at this point. The inner periphery of annular grommet 22 hugs the projecting valve stem 14 to make a close, sliding fit with the surface thereof.

At the junction of shoulder 50 on sleeve 16, the sleeve is reduced in diameter to provide a neck 54 projecting axially downward from the sleeve. Neck 54 supports resilient boot 18 whose inner wall snuggly grips the outer side and end walls of the neck. Boot 18 has an integral annular flange 56 which is clamped between shoulder 50 of metering sleeve 16 and annular seat 44 of housing 12, whereby the boot is supported in slightly stretched condition on neck 54 so that the end wall 58 closely abuts the inner end of neck 54. An aperture 60 is formed centrally in end wall 58 of boot 18 and provides a communicating passage between inlet passage 28 of housing 12 and the interior of metering sleeve 16.

Stem 14 consists of a generally cylindrical member serving as an actuator of the valve assembly to permit dispensing of fluid product. Stem 14 is located concentrically of and in telescoping relation to metering sleeve 16, housing 12, and has an inner end 62 which is telescopingly received in boot 18. At substantially midway along stem 14 an annular enlargement 64 is formed, and compression spring 24 is held between such enlargement and an inner shelf 68 formed internally of metering sleeve 16. Stem 14 is thus normally urged in an outward direction by spring 24, causing the upper face of enlargement 64 to abut against the undersurface of grommet 22 to complete the sealing of the outlet end of the valve housing.

The outer length 70 of stem 14 is hollow to form a discharge passage, and a port 72 is formed in the wall of this portion closely adjacent enlargement 64. In the normal, nondispensing position of the valve stem 14, as seen in FIG. 1, grommet 22 is interposed between port 72 and the interior of metering sleeve 16.

Figure 2:
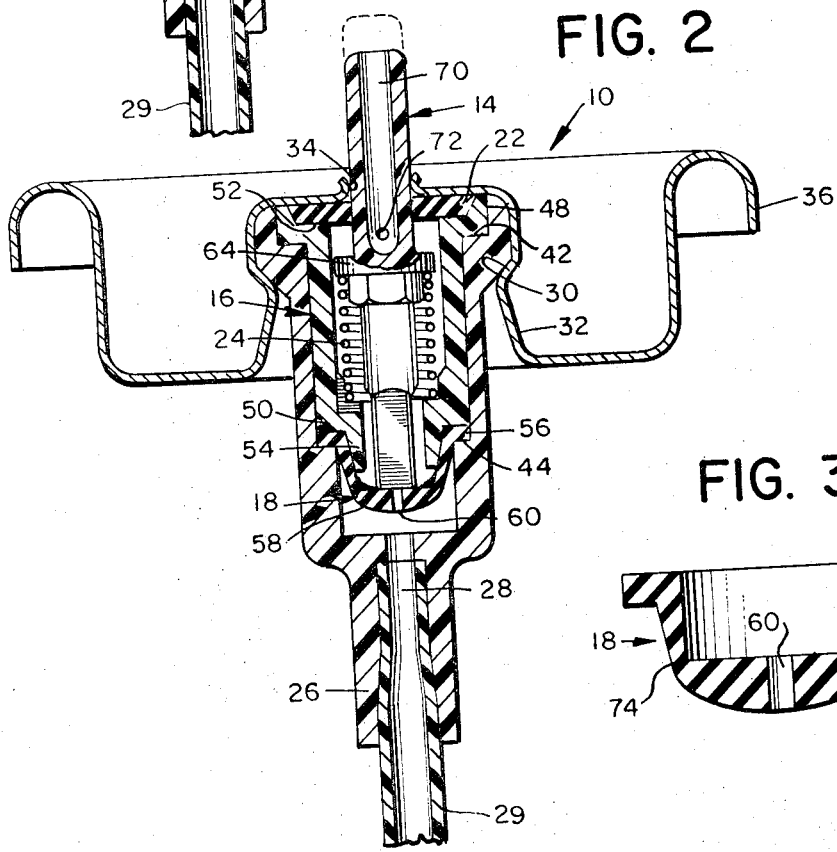
Figure 3:
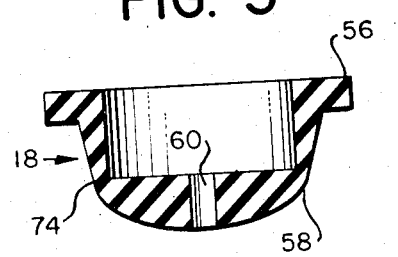

The dispensing cycle for delivering a metered amount of fluid product from the container is initiated by depressing stem 14 axially of the valve housing. As seen in the drawings, the respective axially inner and outer portions 62 and 70 of stem 14, and the positioning of outlet grommet 22 and boot 18 with respect thereto, are so arranged that prior to arrival of discharge port 72 beneath outlet grommet 22, the end of inner portion 62 of core 14 engages the end wall of boot 18 and closes off port 60 in that wall. This immediately interupts communication between inlet 28 and the interior of metering sleeve 16 so that no further fluid can enter the metering chamber. Thereafter, further inward movement of stem 14, as permitted by a longitudinal distension of boot 18, allows discharge port 72 to move beneath grommet 22, thereby bypassing the seal and allowing fluid trapped in the metering chamber formed by sleeve 16 to escape through the discharge port and the hollow outer portion 70 of stem 14. This is the position specifically illustrated in FIG. 2 of the drawings.

Discharge of the metered amount of fluid, as determined by the internal capacity of the chamber formed by metering sleeve 16, takes place in the condition of the valve assembly just described. When the metering chamber is exhausted, stem 14 is allowed to return to its normal non-dispensing position, whereupon communication between inlet 28 and the interior of metering sleeve 16 is again established, but only after discharge port 72 has moved outwardly sufficiently to interpose sealing grommet 22. This prevents discharge of unmetered fluid taking place.

In the preferred embodiment of the valve, the external cylindrical surface of neck 54 on metering sleeve 16 is tapered toward the inner end of the neck. The provision of this taper serves to improve the operation of the valve, in that when the boot 18 is stretched by engagement of the inner end of stem 14, there is a separation of the adjacent neck and boot walls, thereby reducing the drag that is otherwise produced if the neck wall is perfectly straight. In order to further reduce the actuating force required to effect a dispensing cycle of the valve, the wall thickness of the boot is reduced, as at 74 at the junction of end wall 58 with the side wall of the boot. Both of these design features contribute to providing a metering valve which requires an extremely low actuating force for its operation. This is particularly advantageous where the valve is used in combination with motor means, and particularly where is is desired to miniaturize the motor means and make it completely portable by use of a self-contained source of energy, such as a small dry cell battery.

It will also be apparent that the metering capacity of this novel valve can be readily changed during assembly in the manufacturing process of the valve, by the substitution of metering sleeves having different internal diameters or configurations which can be made to fill up more or less of the available internal space in housing 12, as may be desired. Thus a standard valve housing, valve stem and boot, as well as associated compression spring and sealing grommet, can be standardized for all valves produced, yet the capacity of the assembled valve can be readily and inexpensively altered to meet specific customer requirements simply by the substitution of different metering sleeves.

What is claimed is:

1. A low-force-actuated metering valve for dispensing fluid products from an aerosol container, comprising means for temporarily isolating and subsequently discharging a predetermined portion of such fluid product, said valve having
  a generally tubular housing, means for mounting said housing in the mouth of a container, said housing having an inlet for communication with the interior of the container and an outlet for the discharge of fluid product externally upon actuation of said valve,
  means in combination with said housing for isolating a predetermined portion of aerosol product and including
    a. a rigid tubular metering sleeve open at its opposite ends and defining at its interior a metering chamber, said sleeve being telescopingly received in the outlet end of said housing and having means for engaging said housing to provide support therein for said sleeve and to close the outlet of said housing, and
    b. a resilient boot member received on and enclosing the inner end of said sleeve, said boot having an integral annular flange surrounding its open mouth and said sleeve including means for clamping said boot flange in said housing adjacent said housing inlet, said boot forming an inwardly cupped closure stretched over the inner end of said sleeve so that the bottom wall of said boot abuts the end of said sleeve, making a fluid-tight fit with said sleeve, and said boot having a central aperture in its bottom wall which is concentric of said sleeve and valve housing;
  actuatable means for controlling the release of a predetermined portion of aerosol product, comprising an axially reciprocable stem received in the open end of said sleeve at said housing outlet, said stem having a lateral discharge port and a fluid passage communicating said port with the outer end of said stem,
  fluid seal means retained by said housing mounting means and surrounding said stem at said outlet to provide a sliding but fluid-tight fit with said stem,
  means urging said stem to non-dispensing position relative to said outlet seal but yieldable upon depression of said stem to move said discharge port into by-passing position relative to said seal to allow fluid product to escape through said discharge port and stem passage,
  said stem having an inner end terminating adjacent said aperture in said resilient boot in the non-dispensing position of said stem, said stem closing said aperture by contact of its inner end with said boot prior to arrival of said stem discharge port at outlet seal by-passing position upon depressing its stem, continued travel of said stem being permitted by resilient deformation of said boot to allow said stem to arrive at said discharge position wherein said metering chamber is vented to atmosphere through said stem port and passage.

2. A metering valve as defined in claim 1, wherein said metering sleeve exterior wall and said valve housing interior wall are each formed to provide complementary shoulders and steps adjacent their outlet and inlet ends, respectively, the complementary shoulder and step at the outlet end serving to support said metering sleeve in said housing, and the complementary shoulder and step at the inlet end serving to grip between them said boot flange to maintain said boot in stretched condition over the inlet end of said metering sleeve.

3. A metering valve as defined in claim 2, wherein said inlet end of said metering sleeve is of reduced diameter relative to the surrounding valve housing to provide an axially extending necked portion spaced radially from said housing.

4. A metering valve as defined in claim 3, wherein said boot has a section of reduced wall thickness adjacent its bottom wall.

5. A metering valve as defined in claim 4, wherein said necked portion of said metering sleeve tapers radially inward toward its inlet end.

6. A metering valve as defined in claim 3, wherein said necked portion of said metering sleeve tapers radially inward toward its inlet end.

7. An aerosol valve of the type having an axially reciprocable stem, for use in temporarily isolating a predetermined quantity of fluid product stored under pressure in an aerosol container and for releasing such quantity to atmosphere upon reciprocation of said stem, which comprises a generally tubular valve housing open at its axially opposite inlet and outlet ends, having a first internal annular seat adjacent its outlet end and a second internal annular seat disposed axially inward of said first seat, and mounting means for securing said housing in the mouth of the container, said mounting means also serving to cover the outlet end of said housing, a rigid tubular sleeve axially telescoped in the outlet end of said valve housing and making a snug radial fit therewith along its side wall, said sleeve being open at its axially opposite ends and having a first external shoulder at its outer end which abuts said first annular seat of said valve housing and a second external shoulder at its inner end which confronts said second annular seat of said valve housing, said sleeve having a neck of reduced diameter relative to both said sleeve and housing which projects axially from said second external shoulder, an elastic boot on said sleeve neck and having an integral annular flange clamped between said second annular valve housing seat and said second sleeve shoulder, said boot forming an inwardly cupped closure stretched over said neck so that its bottom wall abuts the end of said neck, making a fluid-tight fit with said neck, said boot having a central aperture in its bottom wall which is concentric of said sleeve and valve housing, annular fluid seal means seated in the outlet of said metering sleeve and retained by said valve mounting means, said seal surrounding said valve stem to make a sliding but fluid-tight fit at the outlet end of said valve housing, said valve stem being axially reciprocable in said sleeve, and said valve mounting means being apertured to allow an outer portion of said stem to project axially outwardly thereof, said stem having an annular enlargement intermediate its length which is disposed inwardly of said valve mounting means and annular seal, said enlargement engaging said seal to limit outward movement of said stem relative to said valve housing, said stem also having a lateral discharge port in said outer portion spaced axially outward of said annular enlargement, and a fluid passage communicating said port with the outer end of said stem, said annular seal being interposed in the normal non-dispensing position of said stem between said discharge port and the interior of said metering sleeve, said stem having an inner portion whose end, in said normal non-dispensing position of the stem, is spaced axially from said aperture in said elastic boot but which is engagable with said boot to close said aperture upon axially inward movement of said stem prior to arrival of said stem discharge port in said outer stem portion into communication with the interior of said tubular sleeve, said elastic boot permitting such continued inward travel of said stem by elastic deformation.

\* \* \* \* \*